United States Patent
Toshinsky

(10) Patent No.: US 9,947,421 B2
(45) Date of Patent: Apr. 17, 2018

(54) NUCLEAR REACTOR WITH LIQUID METAL COOLANT

(71) Applicant: JOINT STOCK COMPANY "AKME-ENGINEERING", Moscow (RU)

(72) Inventor: Georgy Iliich Toshinsky, Obninsk (RU)

(73) Assignee: JOINT STOCK COMPANY "AKME-ENGINEERING", Moscow (RU)

( * ) Notice: Subject to any disclaimer, the term of this patent is extended or adjusted under 35 U.S.C. 154(b) by 383 days.

(21) Appl. No.: 14/646,503

(22) PCT Filed: Nov. 26, 2012

(86) PCT No.: PCT/RU2012/000979
§ 371 (c)(1),
(2) Date: May 21, 2015

(87) PCT Pub. No.: WO2014/081332
PCT Pub. Date: May 30, 2014

(65) Prior Publication Data
US 2015/0294745 A1      Oct. 15, 2015

(51) Int. Cl.
*G21C 1/03* (2006.01)
*G21C 15/247* (2006.01)
*G21D 1/00* (2006.01)

(52) U.S. Cl.
CPC ............ *G21C 1/03* (2013.01); *G21C 15/247* (2013.01); *G21D 1/006* (2013.01); *Y02E 30/34* (2013.01); *Y02E 30/35* (2013.01)

(58) Field of Classification Search
CPC ........ G21C 1/03; G21C 15/247; G21D 1/006; Y02E 30/34; Y02E 30/35
(Continued)

(56) References Cited

U.S. PATENT DOCUMENTS 3,242,981 A * 3/1966 Hutchinson ............ G21C 1/03
376/293
4,765,948 A * 8/1988 DeLuca ............. G21C 15/247
376/404
(Continued)

FOREIGN PATENT DOCUMENTS

| RU | 2300817 C2 | 6/2007 |
|---|---|---|
| RU | 2408094 C2 | 10/2009 |
| WO | 2012045691 A1 | 4/2012 |

*Primary Examiner* — Jack W Keith
*Assistant Examiner* — Daniel Wasil
(74) *Attorney, Agent, or Firm* — Nath, Goldberg & Meyer; Jerald L. Meyer

(57) ABSTRACT

A nuclear reactor with a liquid metal coolant includes a housing having a separating shell disposed therein. In the annular space between the housing and the separating shell are disposed at least one steam generator and at least one pump. Inside the separating shell there is an active region, above which a heat collector is disposed. The heat collector is in communication with the vertically central portion of the steam generator in order to separate a stream of liquid metal coolant into ascending and descending flows. Alternatively, the heat collector is in communication with the upper portion of the steam generator in order to create a counter-flow heat exchange regime. Below the reactor head is an upper horizontal cold collector with an unfilled level of coolant, and below the steam generator is a lower accumulating collector in communication with the upper cold collector.

27 Claims, 2 Drawing Sheets

(58) Field of Classification Search
USPC .............................. 376/290, 298, 404, 406
See application file for complete search history.

(56) References Cited

U.S. PATENT DOCUMENTS

| | | | | |
|---|---|---|---|---|
| 5,030,411 A | * | 7/1991 | Cooper | G21C 19/313 376/312 |
| 7,864,913 B2 | * | 1/2011 | Yokoyama | G21C 11/06 376/219 |
| 8,331,523 B2 | * | 12/2012 | Nishiguchi | G21C 1/02 376/404 |

* cited by examiner

NUCLEAR REACTOR WITH LIQUID METAL COOLANT

This is a National Phase Application filed under 35 U.S.C. 371 as a national stage of PCT/RU2012/000979, filed Nov. 26, 2012, the content of which is hereby incorporated by reference in its entirety.

FIELD OF THE INVENTION

The invention relates to nuclear power engineering, in particular to designs of fast neutron nuclear reactors of pool type with a heavy liquid-metal coolant (e.g., lead, lead-bismuth eutectic).

PRIOR ART

A nuclear power plant is known that comprises a reactor with a liquid-metal coolant, wherein under the unfilled level are: a core, steam generators, main circulation pumps with an axial-type impeller, and a shielding gas system, the impeller blades of the main circulation pump are installed on sleeves which axes are perpendicular to the pump shaft axis, and the blades may be rotated to a position where a coolant flow is completely stopped in the pump (RU 15955 U1, 2012).

A dismountable design of a nuclear reactor core with preferential use of a liquid-metal coolant as the primary circuit coolant is known. This structure comprises fuel assemblies, the control and safety system (CSS) casings with absorbers, which casings are fixed in the base plate with the use of collet devices, a collet grip of the CSS casing being fixed in the base plate and made so as the collet nozzle of fuel assemblies embraces, with its inner diameter, the blades of the CSS casing collet grip and retains them in the holding operating condition (RU 2298849 C2, 2007).

A nuclear reactor, in particular a nuclear reactor of pool type, is known that has a main tank accommodating a core comprising a bundle of fuel elements and submerged into a primary coolant circulating between the core and at least one heat exchanger; this reactor is characterized in that the fuel elements extend along corresponding parallel longitudinal axes and have corresponding active sections disposed in the lower ends of the fuel elements and submerged into a primary coolant, thus forming a core, and corresponding service sections that extend upward from the active sections and go out of the primary coolant (WO2009/040644 A2, 2009).

The analogous solution closest to the claimed invention is the nuclear reactor of pool type with liquid-metal cooling (RU 2408094, 2012). This reactor comprises a housing, a core, a pomp (pumps) for circulating a primary circuit coolant through the core, and a steam generator (SG), the pump and the SG being unitized into a solid inseparable assembly arranged in the annular space between the housing and the separating shell; and the primary circuit coolant is taken by the pump (pumps) from the hot collector disposed above the core and horizontally flows to the SG inlet and, from there, goes to the core inlet as a falling flow, thus closing the circulation circuit.

This closest analogous solution has the following drawbacks:

the pump transfers a hot coolant having a temperature approximately 500° C. Structural materials suitable for such temperatures and possessing required long-term corrosion and erosion resistance in a flow of a heavy liquid-metal coolant at velocities on the pump impeller blades approximately 20 m/s are unavailable;

the reactor cover is operated at a high temperature equal to approximately 500° C., which complicates maintenance and cooling of the pump bearings and electric drive, seals of detachable connections on the cover, etc.;

unitizing of the pump and the SG into a single inseparable structure having a cross-section in the shape of a bean complicates repairs, since, when it is required to replace the faulty SG, the pump is to be replaced also;

in a case the SG is leaky, steam bubbles and water drops may be entrained by a coolant falling flow and, possibly, enter the core. This may lead to a reactivity failure of a fast neutron spectrum reactor.

SUMMARY OF THE INVENTION

The technical problem solved in the invention embodiments is raising the nuclear reactor operation reliability and improving the reactor performance.

According to the first embodiment, the nuclear reactor comprises a housing with a cover, the housing accommodating a separating shell with a shielding plug, which shell is arranged in the housing so as to form an annular space; the housing is provided with at least one steam generator and at least one pump that are arranged in their respective shells in the annular space. The core is disposed within the separating shell, in its lower portion; a hot collector is disposed above the core and is in communication in its middle point, via an inlet fitting (or two or more inlet fittings), with a steam generator (or two or more steam generators). A cold coolant from the upper portion of the steam generator freely flows through openings, as made in its shell, into an upper horizontal cold collector with coolant unfilled level. The upper horizontal cold collector is disposed in the annular space formed under the housing cover and between the steam generator and pump shells. A cold coolant from the lower portion of the steam generator goes to a lower accumulating collector communicating with the upper cold collector via an annular channel extending along the reactor housing and via channels formed by in-housing radiation protection elements arranged in the annular space between the separating shell, the housing and the shells of the steam generator and the pumps. The pump inlet communicates with the upper horizontal cold collector through openings made in its shell, and the pump outlet communicates with the lower annular pressure collector that is separated by a horizontal partition from the lower accumulating collector, the lower annular pressure collector being in communication with a core distributing collector through an annular slot. There may be one or more steam generators, one or more pumps, and a number of steam generators may coincide or not coincide with a number of pumps.

The coolant circulation circuit according to the first embodiment will be efficient only for steam generators generating a steam-water mixture, since heat exchange between a coolant and a steam-water mixture in the upper portion of the steam generator goes on according to a forward flow pattern, since, according to this embodiment, feed water is directed to the lower portion of the steam generator, and a steam-water mixture exits from above and then enters a separator, which is not a reactor part, for being separated into water and saturated steam.

In a case where a straight-flow steam generator producing superheated steam is used, the coolant circulation pattern for the primary circuit is used according to the second embodiment. According to the second embodiment, the nuclear reactor comprises a housing with a cover, the housing accommodating a separating shell with a shielding plug, which shell is arranged in the housing so as to form an annular space; the housing is provided with at least one steam generator and at least one pump that are arranged in their respective shells in the annular space. The core is disposed within the separating shell, in its lower portion; a hot collector is disposed above the core and is in communication, via vertical channels made in the shielding plug with an inlet fitting (or two or more inlet fittings) disposed at the level of the upper portion of a steam generator (or two or more steam generators), in order to provide a heat exchange counterflow pattern between a heating coolant and a heated medium. Feed water is directed to the lower portion of the steam generator, and superheated steam exits from the upper portion of the steam generator. A cold coolant, which exits from the lower portion of the steam generator, goes to a lower accumulating collector and further goes via an annular channel extending along the reactor housing and via channels formed by in-housing radiation protection elements arranged in the annular space between the separating shell, the housing and the shells of the steam generator and the pumps, finally entering an upper horizontal cold collector with a coolant unfilled level that is disposed in an annular space under the housing cover and between the shells of the steam generator and the pump. The inlet of each pump communicates with the upper horizontal cold collector through openings made in its shell, and the outlet of each pump communicates with the lower annular pressure collector that is separated by a horizontal partition from the lower accumulating collector, the lower annular pressure collector being in communication with a core distributing collector through an annular slot. There may be one or more steam generators, and also there may be one or more pumps.

According to these two embodiments of the nuclear reactor, the housing and the separating shell of the nuclear reactor preferably have a cylindrical shape, and the steam generators and the pumps are preferably provided with shells (outer casings) of a cylindrical shape and are preferably disposed vertically.

Furthermore, according to these two embodiments of the invention, in order to improve the conditions for natural circulation (NC) of the primary circuit coolant when the pumps are not operated, bypass valves, which connect the collectors therebetween and are opened at the time of stopping, are provided in the partition between the lower accumulating collector of the steam generator and the core pressure collector for the purpose of removing residual energy release. The valves may be provided or not provided with actuators. If the valves are not provided with actuators, they are made of a material having a greater density than that of the coolant, which ensures opening of the valves under action of gravity at the time of stopping the pumps and closing of them under action of hydrodynamic forces at the time of starting the pumps.

In accordance with another variant of improving conditions for natural circulation of the primary circuit coolant, drain ports are made in the partition between the lower accumulating collector and the core pressure collector. In such a case, if the pumps are operated, continuous bypass of the coolant past the core is formed that should not be greater than a small part of rated consumption, in order to exclude inadmissible rise of coolant and fuel temperatures. In order to decrease bypass of the pump, the drain ports may be provided with confusors having hydraulic resistance coefficients that are significantly greater when a coolant flows from the pressure collector of the pumps to the lower accumulating collector than when a coolant flows from the lower accumulating collector to the lower annular pressure collector of the pumps in the natural circulation mode.

Since all pumps (if there are more than one pump) are connected to a common annular pressure collector in parallel, the latter is provided, in order to reduce a bypass flow rate in one of stopped pumps (in a case where it is faulty), with radial flat partitions arranged at an equal distance from the pump axes, which partitions block direct passage of a coolant via the annular pressure collector from the outlets of operating pumps to the outlet of the stopped pump. This enables to decrease a reactor power reduction, when one of the pumps stops, and does not create additional hydraulic resistance during operation of all the pumps, since the radial partitions are arranged in the annular pressure collector symmetrically to the pump axes.

According to the two embodiments of the invention, special fittings on the reactor cover, or those fittings on the reactor cover where steam generators are installed, are provided with relieving bursting diaphragms, in order to exclude the necessity of increasing thicknesses of the reactor cover and housing significantly in a case of postulated multiple leakages in the steam generator tubes and the possibility of increasing pressure in the housing to a steam pressure value that would limit steam pressure in a gas space over a coolant unfilled level in the upper cold collector.

A positive effect, which may be achieved through realizing the embodiments of the invention, as compared to nuclear reactors known in the art, is expressed by new technical properties consisting in improved reliability of a nuclear reactor of pool type with a liquid-metal coolant and its improved performance, i.e.:

the pump transfers a "cold" coolant, which facilitates finding a solution to the task of ensuring long-term corrosion and erosion resistance resource of the pump operative parts;

the reactor housing cover is operated in the conditions of lower temperatures, which ensures higher reliability and simplifies conditions for cooling devices arranged on the cover;

steam generators and pumps may be replaced, when necessary, independently from each other, which reduces time necessary for repairs and decreases repair costs. The claimed structure enables not to associate a number of pumps with a number of steam generators. This structure enables to simply replace a faulty steam generator only, without removing pumps from the reactor;

after leaving the steam generator, a coolant flow enters its unfilled level in the upper cold collector. This circulation pattern excludes the possibility of moisture entering the core in a case of leakage in the steam generator, since steam and water drops enter, together with the ascending coolant flow, into the upper cold collector, where efficient gravity separation goes on at an unfilled level of the coolant horizontal flow, steam bubbles and water drops come to the reactor gas space filled with an inert gas under a small excess pressure, in order to prevent air from entering the gas space through points of possible leakiness, which air, in a case it enters into the gas space, will cause undesirable oxidation of the coolant.

Furthermore, according to the first embodiment of the invention, the separation of a coolant flow coming to the inlet of the steam generator performing, in this case, the function of a steam generator-evaporator, into two parts, namely, into an ascending flow and a descending flow, due to a fitting arranged in the middle portion of the steam generator, reduces its hydraulic resistance eight-fold and enables to reduce common hydraulic resistance of the primary circuit and a required power of the pumps.

BEST MODE FOR CARRYING-OUT OF THE INVENTION

Figure 1:
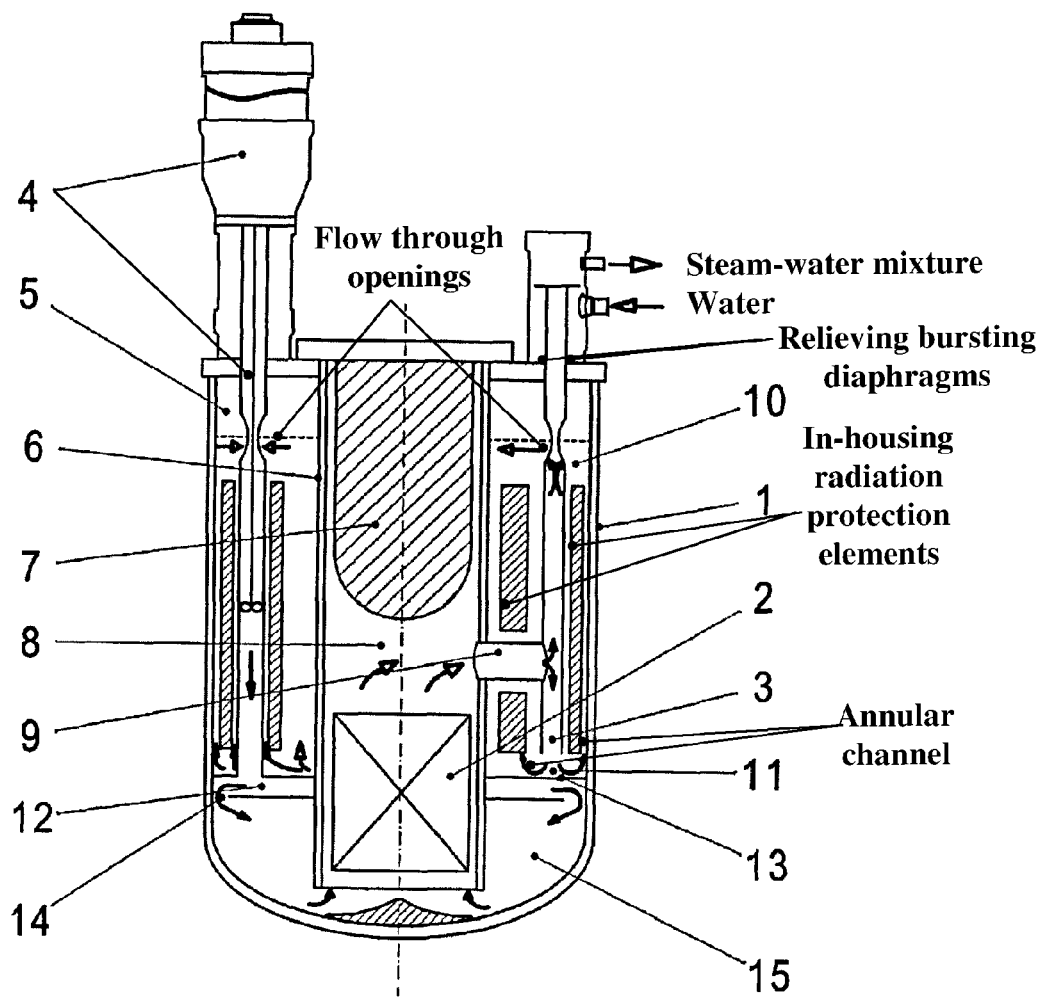
FIG. 1 shows a view of the nuclear reactor according to the first embodiment.
Figure 2:
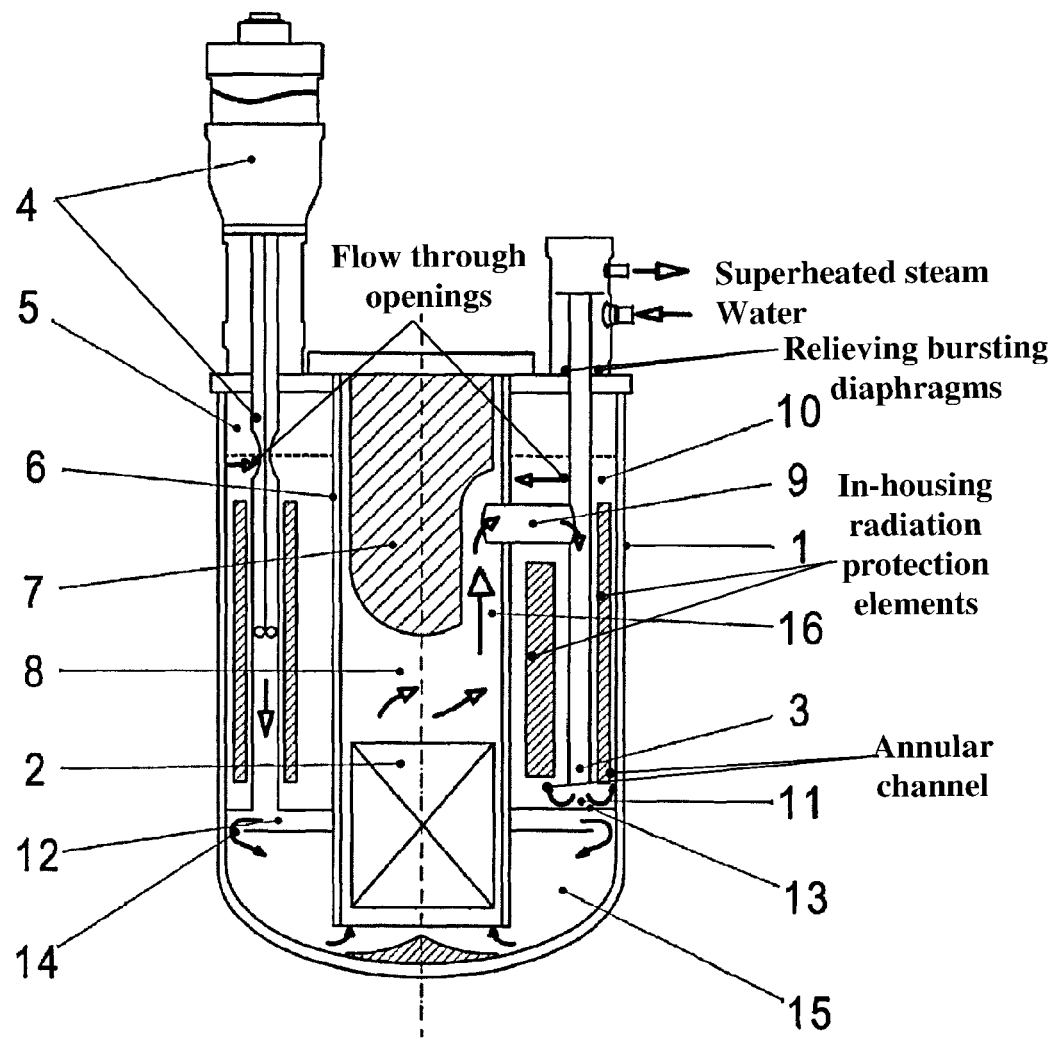
FIG. 2 shows a view of the nuclear reactor according to the second embodiment.

The nuclear reactor comprises a cylindrical housing (1) accommodating a core (2), one steam generator, hereinafter "SG", (or more than one SG) (3) and a pump (or pumps) (4). The SG (3) and the pumps (4) are arranged in their respective shells. A heavy liquid-metal coolant of the primary circuit, e.g., lead or a lead bismuth eutectic, moves in the tube space of the SG, and the coolant of the secondary circuit (water, steam) moves within the tubes.

The SG and the pumps transferring a liquid-metal coolant are arranged in the annular space (5) formed by the reactor cylindrical housing (1) and the cylindrical shell (6). The core (2) is disposed within the cylindrical separating shell (6), in its lower portion, and a shielding plug (7) is disposed in its upper portion.

The SG (3) and the pumps (4) preferably have the cylindrical shape of their respective shells and are preferably arranged vertically, a number of the pumps (4) being not associated with a number of the SGs (3), since they are mounted within the housing independently of each other.

A hot collector (8) is disposed over the core (2), and the liquid-metal coolant of the primary circuit is fed from it to the inlet chambers of the SG via an inlet fitting (9) connecting an opening made in the separating shell (6) with the inlet chamber of the SG (3). If there are several SGs (3), the number of the inlet fittings (9) and the openings made in the separating shell (6) is equal to the number of the SGs.

According to the first embodiment of the invention, the inlet fittings are disposed in the middle (by height) portion of the SG (3).

After entering into the middle portion of the SG (3), a hot liquid-metal coolant is separated into two parts: an ascending flow that washes the upper portion of the SG (3) and freely flows through openings made in the shell of the SG-evaporator into the upper horizontal cold collector (10) with an unfilled coolant level, which collector is disposed in the annular space under the reactor cover and between the shells of the SG and the pumps, and a descending flow that washes the lower portion of the SG (3) and enters into the lower accumulating collector (11) from where it also flows, as an ascending flow, via an annular channel extending along the reactor housing and via channels formed by the in-housing radiation protection elements arranged in the annular space between the separating shell, the housing and the shells of the SG and the pumps, into the upper horizontal cold collector (10) where it is mixed with the liquid-metal coolant coming from the upper portion of the SG (3).

The liquid-metal coolant freely and horizontally flows from the upper horizontal cold collector (10) through the openings in the pump shells to the inlets of the pumps (4) and is further fed, as a descending flow, under pressure created by the pumps into the lower annular pressure collector (12) separated by a horizontal partition (13) from the lower accumulating collector (11).

The coolant further flows from the lower annular pressure collector through an annular slot (14) into the distributing collector (15) of the core (2), thus closing the circulation circuit.

A possible ingress of moisture into the core (2) in a case where the SG has a leakage is excluded due to the fact that any moisture (steam, water drops) from the tube space of the SG 3 is transferred by an ascending flow of the coolant into the upper cold collector (10), where steam is efficiently separated by gravity at the unfilled coolant level and removed into the reactor gas space filled with an inert gas being under a small excess pressure. Moisture is removed from the reactor gas space by conventional means.

In the result, the reactor cover and the impellers of the pumps interact with the cold coolant from the upper horizontal cold collector (10), which enables to improve reliability of their operation and prolong their service life.

The first embodiment of the invention relates to SGs generating a steam-water mixture that is further fed into a separator for separation into water and saturated steam.

The circulation pattern of a liquid-metal coolant of the primary circuit is slightly changed for a direct-flow SG producing superheated steam and corresponds to the second embodiment of the invention.

In this case (the second embodiment of the invention) the inlet fittings (9) of the SG (3) are arranged at the level at which a liquid-metal coolant enters into the upper portion of the SG (3) where the coolant moves as a descending flow for the purpose of organizing a counterflow pattern of heat exchange between the heating coolant and a heated medium, since fed water enters into the SG from below, and superheated steam exits from above.

A hot liquid-metal coolant comes to the inlet fitting (9) (or inlet fittings) of the SG from the hot collector (8) of the core (2) via special channels (16) made in the shielding plug (7) arranged over the core (2) within the cylindrical separating shell (6). The inlet fitting (9) (or inlet fittings) connects the openings made in the separating shell with the inlet chamber (or inlet chambers) of the SG.

In the other respects, the circulation pattern does not differ from that described above for the first embodiment.

In order to improve conditions for natural circulation (NC) of the primary circuit coolant when the pumps are not operated and to remove residual energy release, bypass valves are provided for between the lower accumulating collector of the SG and the pressure collector of the core, which valves connect the said collectors that are opened when the pumps are not operated.

The valves may be provided or may not be provided with their respective actuators. In a case where the valves are not provided with actuators, they are made of a material having a greater density than that of the coolant (e.g., of tungsten). After the pumps are stopped, the valves will be opened under gravity, and after the pumps are started, the valves will be closed by the action of hydrodynamic forces.

When the bypass valves are open, the coolant circulation circuit is shorter and has a lesser hydraulic resistance.

The coolant flows from the core (2) to the hot collector (8) of the core, from where it enters, via the inlet fittings (9), into the middle portion of the SGs (3), if the pattern provides for SGs performing the function of steam generators-evaporators producing wet steam, or into the upper portion of the SGs (3) if direct-flow SGs are used. After that the coolant washes, as a descending flow, the lower portion of the SG-evaporator (the first embodiment of the invention) or the whole SG if it is a direct-flow SG (the second embodiment of the invention) and comes into the lower accumulating collector (11) of the SG, from where it flows through the open bypass valves into the lower annular pressure collector (12) of the core, thus closing the coolant NC circuit.

Another variant of improving conditions for natural circulation of the primary circuit coolant may be realized without using bypass valves by providing drain ports made in the horizontal partition (13) between the lower accumulating collector (11) of the SG and the lower annular pressure collector (12) of the core. In such a case, if the pumps (4) are operated, continuous bypass of the flow past the core is formed that should not exceed a small part of the rated flow, in order to exclude inadmissible rise of a coolant and fuel temperature. In order to reduce bypass of the pump (4), the drain ports may be provided with confusors having hydraulic resistance coefficients that are significantly greater when the coolant flows from the pressure collector of the pumps to the accumulating collector of the SGs, than when the coolant flows in the NC mode from the lower accumulating collector (11) of the SGs to the lower annular pressure collector (12).

Since a coolant flow speed in the NC mode is very slow, in a case of a leakage in the SG (3) steam bubbles and water drops will not be entrained by a coolant descending flow in the SG (3), but they will come to the surface of the coolant unfilled level in the upper horizontal cold collector (10) and will be efficiently separated into the gas space. In order to additionally reduce the possible entering of steam into the core, the bypass valves or drain ports should be disposed at a maximum possible distance from the points where the coolant exits from the SG (3) to the lower accumulating collector (11) of the SG.

Since all the pumps (4) (if there are more pumps than one) are connected in parallel to the common lower annular pressure collector (12), the latter is provided, in order to reduce bypass flow through one of stopped pumps (e.g., if it is faulty), with radial flat partitions arranged at an equal distance from the pump axes and preventing the coolant from directly coming to the outlet of the stopped pump via the lower annular pressure collector (12) from the outlets of the operating pumps. This enables to reduce a decrease in the reactor power when one of the pumps is stopped and does not create additional hydraulic resistance when all the pumps are operated, since the radial partitions in the lower annular pressure collector (12) are arranged symmetrically to the axes of the pumps (4).

In order to exclude the necessity of increasing thicknesses of the reactor cover and housing (1) significantly, which will ensure their firmness in a case of postulated multiple leakages in the tubes of the steam generator (3), and the possibility of increasing pressure in the housing to a steam pressure value, relieving bursting diaphragms are provided that are arranged in special fittings on the reactor cover or in the reactor cover fittings where the SGs (3) are installed. The diaphragm strength is designed for a far lower pressure than the steam rated pressure. In fact, the diaphragms, without placing additional burden on the reactor structure, perform the function of disposable safety devices, since there are no reasons for simultaneous destruction of multiple tubes of the SG (3).

The invention claimed is:

1. A nuclear reactor with liquid-metal coolant, comprising a housing (1) with a cover and a separating shell (6) that is arranged in the reactor housing (1) so as to form an annular space (5) between the separating shell (6) and the housing (1), at least one steam generator (3) and at least one pump (4) being arranged in the annular space (5), each of them being disposed in a respective shell; the separating shell (6) accommodates a shielding plug (7) in its upper portion and a reactor core (2) in its lower portion; and a hot collector (8) is disposed over the reactor core (2), characterized in that the hot collector (8) is made communicating with the steam generator (3) in a middle portion of the steam generator (3) in order to separate a liquid-metal coolant flow into an ascending flow and a descending flow that wash the upper portion and the lower portion of the steam generator (3), respectively; an upper horizontal cold collector (10) is arranged in the annular space under the reactor cover and between the housing (1) and the separating shell (6), and outside of the shell of the steam generator (3) and the shell of the pump (4), the upper horizontal cold collector (10) having an unfilled coolant level and communicating to the upper portion of the steam generator (3) through openings made in the shell of the steam generator (3); a lower accumulating collector (11) is arranged under the steam generator for the purpose of collecting a cold coolant from the lower portion of the steam generator (3), the lower accumulating collector being in communication with the upper horizontal cold collector (10) via an annular channel extending along the reactor housing (1) and via channels formed by in-housing radiation protection elements arranged in the annular channel, the annular channel being formed by the separating shell (6), the housing (1) and the shell of the steam generator (3) and the shell of the pump (4); the inlet of the pump (4) communicates with the upper horizontal cold collector (10) through openings made in the shell of the pump (4), and the outlet of the pump (4) communicates with a lower annular pressure collector (12), the lower accumulating collector (11) and the lower annular pressure collector (12) being separated by a horizontal partition (13), and the lower annular pressure collector (12) being in communication with a reactor core distributing collector (15) through an annular slot (14).

2. The nuclear reactor according to claim 1, characterized in that the nuclear reactor housing (1) and the separating shell (6) are made cylindrical.

3. The nuclear reactor according to claim 1, characterized in that the steam generator (3) and the pump (4) are provided with cylindrical shells and arranged vertically in the annular space (5) between the nuclear reactor housing (1) and the separating shell (6).

4. The nuclear reactor according to claim 1, characterized in that the hot collector (8) is connected to the middle portion of the steam generator through the inlet fitting (9).

5. The nuclear reactor according to claim 1, characterized in that the number of the steam generators (3) is two or more.

6. The nuclear reactor according to claim 1, characterized in that the number of the at least one pump (4) is two or more.

7. The nuclear reactor according to claim 5, characterized in that the number of the at least one pump (4) is two or more.

8. The nuclear reactor according to claim 1, characterized in that the horizontal partition (13) between the lower accumulating collector (11) and the lower annular pressure collector (12) is provided with bypass valves connecting the said collectors (11) and (12) therebetween and disposed at a maximum distance from the outlets of the steam generator (3) that extend to the lower accumulating collector (11).

9. The nuclear reactor according to claim 8, characterized in that the bypass valves are provided with actuators.

10. The nuclear reactor according to claim 8, characterized in that the bypass valves are not provided with actuators and are made of a material having density greater than that of a liquid-metal coolant.

11. The nuclear reactor according to claim 1, characterized in that the horizontal partition (13) between the lower accumulating collector (11) and the lower annular pressure collector (12) is provided with drain ports that are made at a maximum distance from the outlets of the steam generators (3) that extend to the lower accumulating collector (11).

12. The nuclear reactor according to claim 11, characterized in that the drain ports are provided with confusors having hydraulic resistance that is greater when a coolant flows from the lower annular pressure collector of the at least one pump (4) to the lower accumulating collector (11) than when a coolant flows from the lower accumulating collector (11) to the lower annular pressure collector (12) of the at least one pump (4) in the natural circulation mode.

13. The nuclear reactor according to claim 1, characterized in that radial flat partitions are made in the lower annular pressure collector (12) at an equal distance from the axes of the at least one pump (4), when the number of the at least one pump (4) is greater than one.

14. The nuclear reactor according to claim 1, characterized in that relieving bursting diaphragms are made in the reactor cover, including locations where the steam generators (3) are installed.

15. A nuclear reactor with liquid-metal coolant, comprising a housing (1) with a cover, the housing (1) comprising a separating shell (6) arranged therein to form an annular space (5) between the separating shell (6) and the housing (1); at least one steam generator (3) and at least one pump (4) are each arranged in a respective shell in the annular space (5), a shielding plug is disposed inside the separating shell (6) in its upper portion, and a reactor core (2) is disposed in its lower portion; and a hot collector (8) is disposed above the reactor core, characterized in that the hot collector (8) is made so as to communicate, via channels made in the shielding plug (7), with an inlet fitting (9) arranged at a height corresponding to the level of the upper portion of the steam generator (3); an upper horizontal cold collector (10) with an unfilled coolant level is disposed in an annular space under the reactor cover and between the housing (1) and the separating shell (6), and outside of the shell of the steam generator (3) and the shell of the pump (4); and a lower accumulating collector (11) is disposed under the steam generator (3), being in communication with the upper horizontal cold collector (10) via an annular channel extending along the reactor housing (1) and via channels formed by in-housing radiation protection elements arranged in the annular channel, the annular channel being formed by the separating shell (6), the housing (1) and the shell of the steam generator (3) and the shell of the pump (4); the inlet of the pump (4) is connected to an upper horizontal cold collector (10) through openings made in the shell of the pump (4), and the outlet of the pump (4) is connected to a lower annular pressure collector (12), the lower accumulating collector (11) and the lower annular pressure collector (12) being separated by a horizontal partition (13), and the lower annular pressure collector (12) being in communication, via an annular slot (14), with a distributing collector (15) of the reactor core (2).

16. The nuclear reactor according to claim 15, characterized in that the nuclear reactor housing (1) and the separating shell (6) are made cylindrical.

17. The nuclear reactor according to claim 15, characterized in that the steam generator (3) and the pump (4) are provided with cylindrical shells and arranged vertically in the annular space (5) between the nuclear reactor housing (1) and the separating shell (6).

18. The nuclear reactor according to claim 15, characterized in that the number of the steam generators (3) is two or more.

19. The nuclear reactor according to claim 15, characterized in that the number of the at least one pump (4) is two or more.

20. The nuclear reactor according to claim 18, characterized in that the number of the at least one pump (4) is two or more.

21. The nuclear reactor according to claim 15, characterized in that the horizontal partition (13) between the lower accumulating collector (11) and the lower annular pressure collector (12) is provided with bypass valves connecting the said collectors (11) and (12) therebetween and disposed at a maximum distance from the outlets of the steam generator (3) that extend to the lower accumulating collector (11).

22. The nuclear reactor according to claim 21, characterized in that the bypass valves are provided with actuators.

23. The nuclear reactor according to claim 21, characterized in that the bypass valves are not provided with actuators and are made of a material having density greater than that of a liquid-metal coolant.

24. The nuclear reactor according to claim 15, characterized in that the horizontal partition (13) between the lower accumulating collector (11) and the lower annular pressure collector (12) is provided with drain ports that are made at a maximum distance from the outlets of the steam generators (3) that extend to the lower accumulating collector (11).

25. The nuclear reactor according to claim 24, characterized in that the drain ports are provided with confusors having hydraulic resistance that is greater when a coolant flows from the lower annular pressure collector (11) of the at least one pump (4) to the lower accumulating collector (11) than when a coolant flows from the lower accumulating collector (11) to the lower annular pressure collector (12) in the natural circulation mode.

26. The nuclear reactor according to claim 15, characterized in that radial flat partitions are made in the lower annular pressure collector (12) at an equal distance from the axes of the at least one pump (4), when the number of the at least one pump (4) is greater than one.

27. The nuclear reactor according to claim 15, characterized in that relieving bursting diaphragms are made in the reactor cover, including the location where the steam generator (3) is installed.

* * * * *